G. GOEWEY.
Grain Fan.
No. 26,760.
Patented Jan'y 10, 1860.
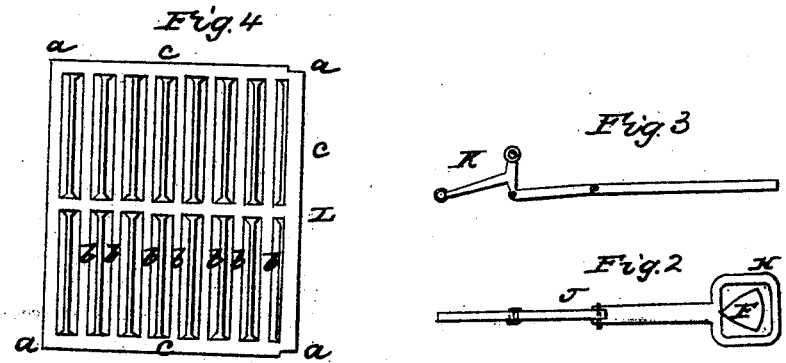
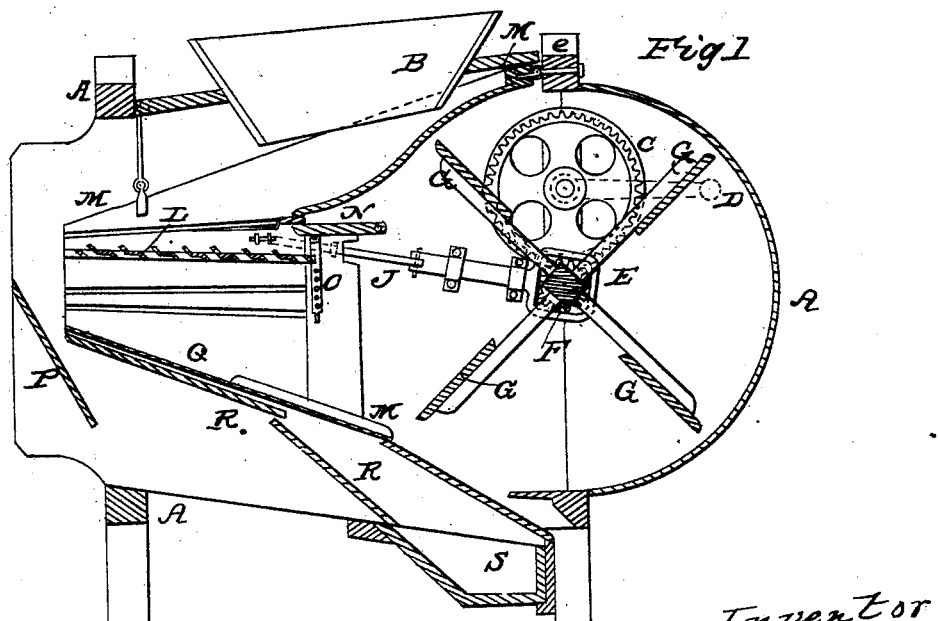
Witnesses,
J. E. Shaw
Charles D. Freeman
Inventor
George Goewey

UNITED STATES PATENT OFFICE.

GEO. GOEWEY, OF PHILADELPHIA, PENNSYLVANIA.

GRAIN-FAN.

Specification of Letters Patent No. 26,760, dated January 10, 1860.

*To all whom it may concern:*

Be it known that I, GEORGE GOEWEY, of the city of Philadelphia and State of Pennsylvania, have invented certain new and useful Improvements in Grain-Fans; and I do hereby declare that the following is a full, clear, and exact description of the construction and operation of the same, reference being had to the annexed drawings, in which—

Figure 1 represents a transverse section of the complete machine, and the remaining three figures represent parts of the machine, viz: Fig. 2 a side view of the cam, with its yoke and the jointed rod for transmitting the shaking motion to the shoe or frame which contains the sieve; Fig. 3 a top view of the yoke, rod and crank; Fig. 4 a top view of the new form of sieve used.

In Fig. 1 A represents the frame of the machine; B the hopper; C the large cog-wheel turned by means of a crank-handle D and gearing into the small cog-wheel E.

In Figs. 1 and 3 F represents a three-faced cam.

G G, &c., Fig. 1, represent the leaves of the fan. The small cog-wheel, cam and fan are on the same shaft.

H, Figs. 1 and 2, is a yoke which receives from the cam a vibratory motion and transmits it through a joint, I, and bell-crank, K, shown in Fig. 3, to the sieve, L.

M represents the shoe or frame, for the sieve or sieves, suspended in the ordinary way.

N is an adjustable wind-guide, suspended by pivots or their equivalents at its back edge almost contiguous to the inner edge of the path described by the leaves of the fan. It may be raised or lowered and is held in the desired position by a spring-catch, O.

P, Fig. 1, is the tail-board, sliding in grooves. It is raised or lowered as found necessary to separate the tailings from the chaff.

Q is a screen down which the grain runs after it has passed through the sieve, L.

R is a board under the screen, Q, to conduct the waste which passes through the screen, Q, into the drawer, S.

The sieve L, which may be made wholly of metal or wood consists of a series of double-inclined slats, shown in section in Fig. 1. Each one of these slats presents three portions, to wit: an upper portion of about one third the width of the slat inclining upward in the direction of the blast; a middle portion of about one third the width of the slat being flat on a line with the frame of the sieve; and a lower portion, of about one third the width of the slat, inclining downward toward the blast in a line parallel with the upper or first mentioned portion. The slats in a working machine are about three fourths of an inch in width; which gives a space of one fourth of an inch in width between the slats for the grain to pass through. They are cheaply made by taking a piece of solid sheet-metal of the required size, to wit: *a a a a*, Fig. 4, and stamping or cutting the middle portion into slats marked *b, b,* &c., leaving a plain margin, C, on the four sides, through which the slatted sheet is fastened to a wooden frame. When the slats are stamped in, the cutting and inclining are done at one operation. The advantages of this form of sieves are that the spaces between the inclined slats may be made large enough to let any or all kinds of grain pass through freely and rapidly and from the peculiar form and shape of the slats to prevent all foreign substances, such as cheat, cockle, smut, &c., from passing through with the grain. These substances being lighter than the grain are carried farther by the blast and alight on the flat portions of the inclined slats, passing from one to another aided by the blast and the motion of the sieve, over to the tail-board; by means of which they may be directed into a separate place or allowed to pass out with the chaff.

The object of using the cam, F, and the advantages gained by it, are to increase by at least fifty per cent. the shaking motion of the sieve or sieves; and I am thereby enabled to produce a machine which cleans grain much more efficiently and rapidly than the fans in ordinary use, with an application of equal or less power.

The object of making the wind-guide adjustable, as shown, is to have control over and direct the force of the blast-from-the-fan, to any desired part of the sieve or sieves.

The form of sieves described may be used with a stationary wind-guide, but to more advantage with an adjustable one such as shown.

The parts of the sieve shown, may be slightly varied, without materially lessening its effectiveness.

Having thus described my improvements what I claim as new in grain-fans and desire to secure by Letters Patent, is—

The employment of a sieve constructed as shown and described, for the purpose of cleaning grain.

GEORGE GOEWEY.

Witnesses:
J. E. SHAW,
CHARLES D. FREEMAN.